Sept. 20, 1927.  H. L. BROOKE  1,642,720
INFINITELY VARIABLE GEAR
Filed Feb. 20, 1925

Inventor
H. L. Brooke
By Marks & Clerk
Attys.

Patented Sept. 20, 1927.

1,642,720

UNITED STATES PATENT OFFICE.

HOLMAN LINNELL BROOKE, OF BRADFORD, ENGLAND.

INFINITELY-VARIABLE GEAR.

Application filed February 20, 1925, Serial No. 10,673, and in Great Britain March 19, 1924.

The present invention has reference generally to improvements in gearing and more particularly relates to transmission gearing of the type possessing an infinitely variable ratio. The invention as its primary aim and object contemplates the provision of transmission gearing employing in combination with a driving and a driven shaft the arrangement of a centrifugal clutch device which includes driving and driven members with the driven member connected with the driven shaft and means interposed between the driving member of the clutch device and the driving shaft responsive to variations in the ratio of speed between the driving and driven shafts to increase the speed of the driving member of a clutch device incident to the reduction of speed of the driven shaft relative to the driving shaft.

The invention further comprises the details of construction and arrangement hereinafter described and claimed.

Referring to the accompanying explanatory drawings:—

The same reference letters in the different views indicate the same parts.

Figure 1:
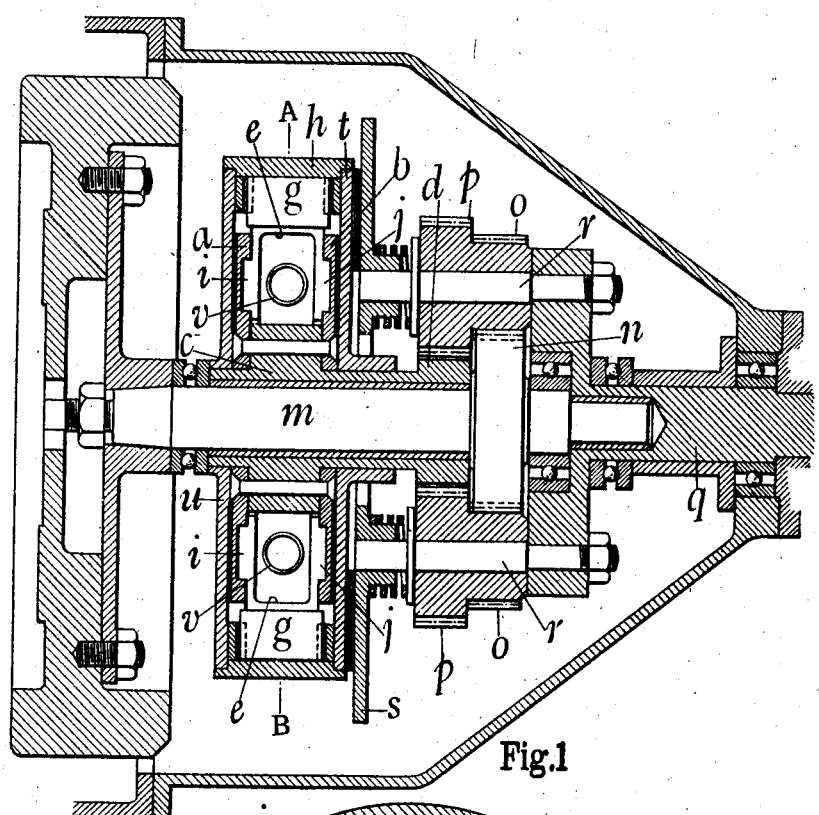
Figure 1 is a sectional elevation of an infinitely variable gear constructed in one convenient form in accordance with my invention.
Figure 2:
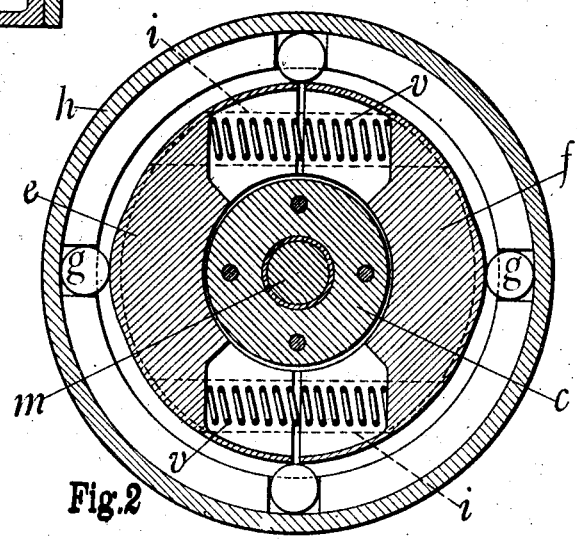
Figure 2 is a sectional elevation on the line A B, Figure 1.

I provide between rings or discs $a$, $b$, secured to the hollow driving shaft $c$ with the gear wheel $d$ thereon, bodies $e$, $f$, which may be of the sectional shape shown in Figure 2, and which present practically a continuous peripheral surface to rollers $g$ interposed between themselves and the driven member $h$. The said bodies have their mass concentrated so that the action of centrifugal force will tend to move them in radial directions opposed to one another. The rings or discs $a$ and $b$ have slots or grooves $i$, $j$, therein, into which parts of the weighted bodies $e f$ extend so as to act as keys ensuring the rotation of the weights with the discs $a$, $b$, whilst allowing radial movement of the weights under centrifugal force and as hereinafter described.

Each weighted body $e f$ has a peripheral crest or wave at a point on a radial centre coincident with the direction of radial movement of the weight under centrifugal force. Such crest or wave projects an amount which does not exceed the versed sine of half the angle subtended by the wave, the versed sine being taken about the centre of gravity of the weight. It will be seen that as the waves make contact with the rollers $g$, the weights $e$ and $f$ will be forced inwards against the action of centrifugal force. The springs $v$ tend to hold the weights $e$ and $f$ in their extended positions.

The driving shaft $m$ has a gear wheel $n$ thereon. Such wheel meshes with the planet wheels $o$ of an epicyclic or differential gear; the other planet wheels $p$ mesh with the sun wheel $d$ before referred to which is connected to the infinitely variable gear construction previously described. The driven shaft $q$ is connected to the spindles $r$ carrying the planet pinions $o$, $p$. The ends of the spindles $r$ form a driving means for the clutch plate $s$ which is in engagement with the side member $t$ which along with the side member $u$ support and are secured to the driven ring $h$ of the infinitely variable gear unit.

In action, the weighted bodies $e$ and $f$ press against the rollers $g$ under centrifugal force and by reason of the wave-like formation of the peripheral surface of the weights, the latter will be given reciprocatory movements if the driven shaft $q$ rotates at a slower speed than the driving shaft $m$. It will be seen that if $m$ and $q$ rotate at the same rate, then the epicyclic or differential gear, shaft $q$ and infinitely variable gear all rotate as one unit. The differential gear may be of any suitable proportions, but preferably it is so proportioned that variations of speed of the driven element $q$ cause inverse variations of speed of the shaft $c$. Thus if the speed of $q$ decreases the speed of $c$ increases independently of the speed of the shaft $m$. The resistance of the weights $e f$, to inward movement against the action of centrifugal force relatively to the resistance of the driven element to rotation determines the speed of the driven element relatively to the driving element.

It will be understood that when the weighted bodies are being rotated and their crests are moving between the rollers $g$, no resistance is offered to such rotation nor to the outward movement of the weights to their full extent under centrifugal action. During such periods of rotation therefore, the weights accumulate energy enabling the driven member to deliver a higher torque than is transmitted by the driving member.

The speed of the driven member is so related to its torque that the energy absorbed by the driven system will equal the energy transmitted by the driving system or prime mover.

I claim:—

1. In a transmission gearing of the character described in combination, a driving shaft, a driven shaft, a centrifugal clutch device including driving and driven members, means for connecting the driven member with the driven shaft, means directly interposed between the driving member and the driving shaft and driven shaft and responsive to variations in the ratio of speed between the driving and driven shafts to increase the speed of the driving member incident to the reduction of speed of the driven shaft relative to the driving shaft and comprising differential gearing composed of a planet carrier directly connected with the driven shaft, sun wheels directly carried by the driving shaft and the driving member, and the means for connecting the driven member with the driven shaft being directly connected with the planet carrier, substantially as and for the purposes set forth.

2. A transmission gearing as claimed in claim 1, wherein the means for connecting the driven member with the driven shaft includes a spring controlled clutch device.

3. In a transmission gearing of the character described in combination, a driving shaft, a driven shaft, a centrifugal clutch device including a driving member in the form of a sleeve mounted about the driving shaft, a driven member rotatably mounted about the sleeve, differential gearing including a planet carrier directly connected to the driven shaft and embodying pintles and double planet pinions mounted thereon, sun wheels directly carried by the drive shaft and the driving member and meshing with the adjacent double pinions, and a spring controlled clutch plate mounted on the pintles and engaged with the driven member, substantially as and for the purposes set forth.

In testimony whereof I have signed my name to this specification.

HOLMAN LINNELL BROOKE.